United States Patent
Connan

Patent Number: 5,849,241
Date of Patent: Dec. 15, 1998

[54] MULTICHAMBER CONTAINER WITH EXPANDED INTERIOR WALLS

[75] Inventor: Patrick Andre Connan, Lebanon, N.J.

[73] Assignee: Colgate-Palmolive Company, New York, N.Y.

[21] Appl. No.: 771,720

[22] Filed: Dec. 20, 1996

[51] Int. Cl.$^6$ ..................................................... B29C 49/18
[52] U.S. Cl. ........................... 264/529; 264/531; 264/532; 425/525; 425/530; 215/6; 220/555
[58] Field of Search ...................................... 264/523, 532, 264/537, 540, 515, 513, 512, 529, 531, 534; 425/525, 529, 530; 215/6; 220/555

[56] References Cited

U.S. PATENT DOCUMENTS

| | | |
|---|---|---|
| D. 277,073 | 1/1985 | Czech . |
| D. 306,554 | 3/1990 | Lawson . |
| D. 307,113 | 4/1990 | Thompson . |
| D. 311,861 | 11/1990 | Vanhoutte . |
| D. 315,496 | 3/1991 | Pettengill . |
| D. 356,026 | 3/1995 | Iaia et al. . |
| 1,363,064 | 12/1920 | Stegath . |
| 1,676,734 | 7/1928 | Hopkins . |
| 1,828,865 | 10/1931 | Hopkins . |
| 1,894,115 | 1/1933 | Murphy . |
| 2,103,817 | 12/1937 | Johnson . |
| 2,107,987 | 2/1938 | Johnson . |
| 2,517,027 | 8/1950 | Rado . |
| 2,661,871 | 12/1953 | Huenergardt . |
| 2,939,610 | 6/1960 | Castelli . |
| 2,944,705 | 7/1960 | Strumor . |
| 2,951,264 | 9/1960 | Bailey ..................................... 264/540 |
| 2,959,327 | 11/1960 | Bloom . |
| 3,105,615 | 10/1963 | Koga . |
| 3,166,221 | 1/1965 | Neilsen . |
| 3,182,728 | 5/1965 | Zabriskie . |
| 3,197,071 | 7/1965 | Kuster . |
| 3,227,319 | 1/1966 | Rosier . |
| 3,380,632 | 4/1968 | Wilson . |
| 3,506,157 | 4/1970 | Dukess . |
| 3,788,520 | 1/1974 | Dukess . |
| 3,881,529 | 5/1975 | Mannara . |
| 3,948,704 | 4/1976 | Evans . |

(List continued on next page.)

FOREIGN PATENT DOCUMENTS

| | | |
|---|---|---|
| 0 503 824 | 9/1992 | European Pat. Off. . |
| 0 531 536 A1 | 3/1993 | European Pat. Off. . |
| 0576222 | 6/1993 | European Pat. Off. . |
| 0 693 437 | 1/1996 | European Pat. Off. . |
| 0 703 153 A2 | 3/1996 | European Pat. Off. . |
| 3420324 | 1/1988 | Germany . |
| 43 35 970 | 4/1995 | Germany . |
| 29515380 | 1/1996 | Germany . |
| 61-171321 | 8/1986 | Japan ..................................... 264/540 |
| 2-147317 | 6/1990 | Japan . |
| 2-205501 | 8/1990 | Japan . |
| 3-236932 | 10/1991 | Japan ..................................... 264/537 |
| 4-29807 | 1/1992 | Japan ..................................... 264/537 |
| 5-254003 | 10/1993 | Japan . |
| 112375 | 12/1962 | Pakistan . |
| 2142611 | 1/1985 | United Kingdom . |
| WO 9005674 | 5/1990 | WIPO . |
| WO 94/14680 | 7/1994 | WIPO . |

OTHER PUBLICATIONS

PCT Search Report.

*Primary Examiner*—Catherine Timm
*Attorney, Agent, or Firm*—Michael McGreal

[57] ABSTRACT

Multichamber tubular containers are made by extrusion or injection stretch blow molding. The containers usually will have two or three chambers and one or more web walls. The web walls are relatively rigid as formed. The web walls must be stretched laterally to increase their flexibility which is needed for the uniform dispensing of product from the tubular chambers. The webs can be stretched mechanically by the rotation of rods, such as stretch rods, or pneumatically by a differential gas pressure in the chambers while the webs are at or near the glass transition temperature and can flow. The web walls for a circular tubular container can be stretched up to about one-half the diameter of the tubular container.

15 Claims, 4 Drawing Sheets

U.S. PATENT DOCUMENTS

| | | | |
|---|---|---|---|
| 3,980,222 | 9/1976 | Hood . | |
| 4,014,463 | 3/1977 | Hermann . | |
| 4,040,420 | 8/1977 | Speer . | |
| 4,046,288 | 9/1977 | Bergman . | |
| 4,089,437 | 5/1978 | Chutter . | |
| 4,099,651 | 7/1978 | Von Winckelmann . | |
| 4,148,417 | 4/1979 | Simmons . | |
| 4,211,341 | 7/1980 | Weyn . | |
| 4,260,077 | 4/1981 | Schroeder . | |
| 4,487,757 | 12/1984 | Kiozpeoplou . | |
| 4,528,180 | 7/1985 | Schaeffer . | |
| 4,687,663 | 8/1987 | Schaeffer . | |
| 4,742,940 | 5/1988 | Wilkinson . | |
| 4,747,517 | 5/1988 | Hart . | |
| 4,773,562 | 9/1988 | Gueret . | |
| 4,819,789 | 4/1989 | Linner . | |
| 4,964,539 | 10/1990 | Mueller . | |
| 4,974,756 | 12/1990 | Pearson . | |
| 4,981,241 | 1/1991 | Keller . | |
| 5,020,694 | 6/1991 | Pettengill . | |
| 5,038,963 | 8/1991 | Pettengill . | |
| 5,045,305 | 9/1991 | Clarkson . | |
| 5,076,464 | 12/1991 | Simon . | |
| 5,078,963 | 1/1992 | Mallen . | |
| 5,137,178 | 8/1992 | Stokes . | |
| 5,145,668 | 9/1992 | Chow . | |
| 5,209,376 | 5/1993 | Dirksing . | |
| 5,224,627 | 7/1993 | Weag . | |
| 5,232,108 | 8/1993 | Nakamura | 264/540 |
| 5,242,066 | 9/1993 | Kelsey | 215/6 |
| 5,244,120 | 9/1993 | O'Meara . | |
| 5,269,441 | 12/1993 | O'Meara . | |
| 5,289,949 | 3/1994 | Gentile . | |
| 5,318,203 | 6/1994 | Iaia et al. . | |
| 5,332,124 | 7/1994 | Cancro . | |
| 5,335,827 | 8/1994 | Gentile . | |
| 5,398,828 | 3/1995 | Valyi | 215/6 |
| 5,476,647 | 12/1995 | Chow . | |
| 5,482,170 | 1/1996 | Semersky et al. | 215/6 |
| 5,529,195 | 6/1996 | Valyi | 215/6 |
| 5,579,937 | 12/1996 | Valyi | 264/537 |
| 5,611,988 | 3/1997 | Mahajan | 264/523 |

MULTICHAMBER CONTAINER WITH EXPANDED INTERIOR WALLS

FIELD OF THE INVENTION

This invention relates to the molding of more uniform dispensing multichamber containers. More particularly, this invention relates to the blow molding of multichamber containers with laterally expanded interior web walls to provide for more uniform dispensing of the products from each of the chambers of the containers.

BACKGROUND OF THE INVENTION

This invention is directed to containers broadly and to tubular containers as one of the preferred embodiments. Highly flexible internal web walls are very useful in the construction of tubular containers that are to have uniform dispensing properties. This permits a dispensing force applied to the exterior surface to be more uniformly received by the materials within the various chambers of the container.

Tubular containers are used for dispensing a number of products. These include food products, oral care products and personal care products. They are particularly useful in dispensing oral care and personal care products. These products are viscous materials such as lotions, pastes or gels. The tubular containers that presently are used are primarily single chamber tubular containers and encompass a range of materials and a number of manufacturing techniques. These tubes comprise metallic tubes, multilayer laminate tubes, extruded tubes and blow molded tubes. Metallic tubes usually are collapsible aluminum tubes. Multilayer laminate tubes can be comprised solely of polymer layers or can contain paper and/or metal foil layers. A paper layer would be a print layer and a foil layer would be a barrier layer as well as a layer that produces a collapsible tube. Extruded tubes can be made from a continuously extruded tube that is cut to the desired lengths. This can be of a single layer or multilayer plastic construction.

In most laminate tubes or extruded tubes the tube body is produced separate from the tube shoulder and nozzle. The tube shoulder and nozzle can be injection molded and then bonded onto the tube body. If not so formed and bonded onto the tube body, it can be compression molded to the tube body. In this technique the nozzle and shoulder are formed at the same time that they are bonded onto the tube body.

Blow molded tubes presently are produced in a single chamber form by an extrusion blow molding technique. In this technique, materials are extruded into a tubular form, placed in a mold that is the shape of the desired tube and a gas, such as air, is blown into the extrusion to form the extrusion to the shape of the mold. The tube then as taken from the mold has a fully formed shoulder and nozzle as well as sidewall. The bottom end also will be closed. The tubular container can be top filled or the bottom end can then be severed so that the tube can be filled with product from the bottom and the bottom sealed. In contrast to the multilayer laminate tubes and the extruded tubes, these blow molded tubes are produced in a finished form. No additional forming such as connecting a shoulder and nozzle is required. However, the blow molded tubes of this invention also are an improvement over the presently used blow molded tubes since they can be produced to have a plurality of chambers and dividing walls that are highly flexible.

A preferred blow molded tubular container recently developed by the inventor and others is produced by injection stretch blow molding. These are tubular containers with superior barrier and strength properties. By the plastic being biaxially oriented it has improved strength for a given thickness. These injection stretch blow molded containers can be of a monolayer or a multilayer construction and can be of a single chamber or multichamber construction.

In the various techniques for producing multichamber tubular containers, there is a need to increase the lateral dimension of the interior web walls. These are the walls that separate the tubular container into a plurality of chambers. The web walls are increased in the lateral dimension for various reasons. One reason is to reduce the rigidity of the web walls. Another reason is to assist in the formation of a lower crimp seal when the tubular container is bottom filled and then crimp sealed. Another reason is that a web wall with an increased lateral dimension provides for a greater flexibility of the web walls which, in turn, results in a more uniform dispensing of the materials from the chamber of the tubular container.

In the present invention the tubular containers can be of essentially any shape. The lateral dimension of the interior web walls can be modified by laterally moving rods, such as the stretch rods, in each chamber while the web walls are in a heated condition so that the separating web walls are reformed to a different lateral width. This reforming the web walls to a different lateral width also can be accomplished through the use of a differential gas pressure in one or more of the chambers. In each technique this is done while the plastic is in the range of the glass transition temperature and can flow under an applied force. Also, the chambers can be in essentially any number, size and arrangement. By expanding the width of the webs, the webs are made less rigid and more flexible and provide for a more uniform dispensing from the containers.

The processes of the present invention solve the problems of how to produce useful multichamber containers having more uniform dispensing properties, increased strengths, relatively thin and much less rigid web walls and decreased suckback of air and product back into the tube after a dispensing. There is provided a method to increase the lateral dimension of the interior web walls of the container at the time that the containers are being produced or at a later time. These techniques are particularly useful for tubes produced by extrusion blow molding and injection stretch blow molding techniques. In each of these techniques the web walls are initially produced across the lateral dimension of the container. These web walls must be stretched to gain the properties and advantages that have been described above.

BRIEF SUMMARY OF THE INVENTION

In the production of blow molded multichamber containers, the interior web walls of the chambers have a limited flexibility. The lateral dimension of these web walls is essentially the diameter or related lateral dimension of the container. In order to provide for a more uniform dispensing, the lateral dimension of the web walls should be increased. This decreases the rigidity of the interior web walls and increases the flexibility of these web walls. This also will assist in the formation of crimp seals in tubular containers where the web wall is to be within the crimp seal. The techniques of this invention can be used effectively to increase the lateral dimension of web walls produced by any technique. However, these techniques are very useful when the multichamber containers are produced by blow molding, and particularly, when produced by injection stretch blow molding. In these blow molding processes a preform is extrusion or injection molded. This preform will have the same number of chambers of the final container. This preform is heated to about the glass transition temperature of the plastic and placed in a mold that has the desired shape of the container. A gas such as air then is blown into the container to form the preform to the shape of the mold. For extrusion blow molding a gas, such as air, is blown into the open ended extruded preform to form this preform to the shape of the mold. For injection stretch blow molding stretch rods are placed into each chamber and a gas or fluid is injected as the stretch rods move downwardly to longitudinally stretch the tube preform while blowing the tube preform laterally to the final shape of the tube. In a preferred embodiment, the tubular container is formed with the shoulder and neck finish fully formed and in place.

The tubular containers usually will be formed with a sufficiently large dispensing opening so that they also can be filled through this opening. However, as an option, the bottom optionally then can be severed from the tubular container, if necessary, and the tubular container bottom filled. This tubular container after being filled from the bottom is then crimp sealed. Top filling is preferred since it will retain more of the strength of the tubular container.

One method to laterally stretch the separating web walls of the tube multichambers is by moving rods, such as the stretch rods, laterally while the plastic of the interior walls is at a temperature at or near the glass transition temperature and in a flowable condition. This will stretch the interior web walls that are in contact with the rods to a greater lateral dimension than as formed. This will reduce the rigidity of the web walls and increase the flexibility of the web walls. The lateral dimension of the interior web wall can be measured up to about one-half the circumference for a tubular container. However, it primarily will provide for better control of dispensing of substances from the multiple chambers.

An additional option is to laterally stretch the interior web walls of the tube chambers by changing the pressure in at least one chamber during or after the time the tubular container has been blown to its shape. This is useful when forming the container by blow molding and can be accomplished by increasing or decreasing the pressure of the blowing gas in a chamber during or after blowing while the plastic of the web walls is in a flowable condition. This will increase the lateral dimension of the web walls and result in a more flexible web wall and a better control of the dispensing of the substances from each chamber of the tubular container. Preferably there are rods in the chambers during the pressure differential step to aid in the lateral stretching of the web walls.

This invention solves the problems of producing multichamber tubular containers, and in particular, blow molded tubular containers, that have improved control in the dispensing from each of the chambers. This is solved by providing dividing web walls which have greater flexibility by having a lateral dimension greater than that of the tubular container. The greater flexibility of the interior web walls provides for a more uniform distribution of an applied dispensing force throughout the container.

DETAILED DESCRIPTION OF THE INVENTION

Figure 1:
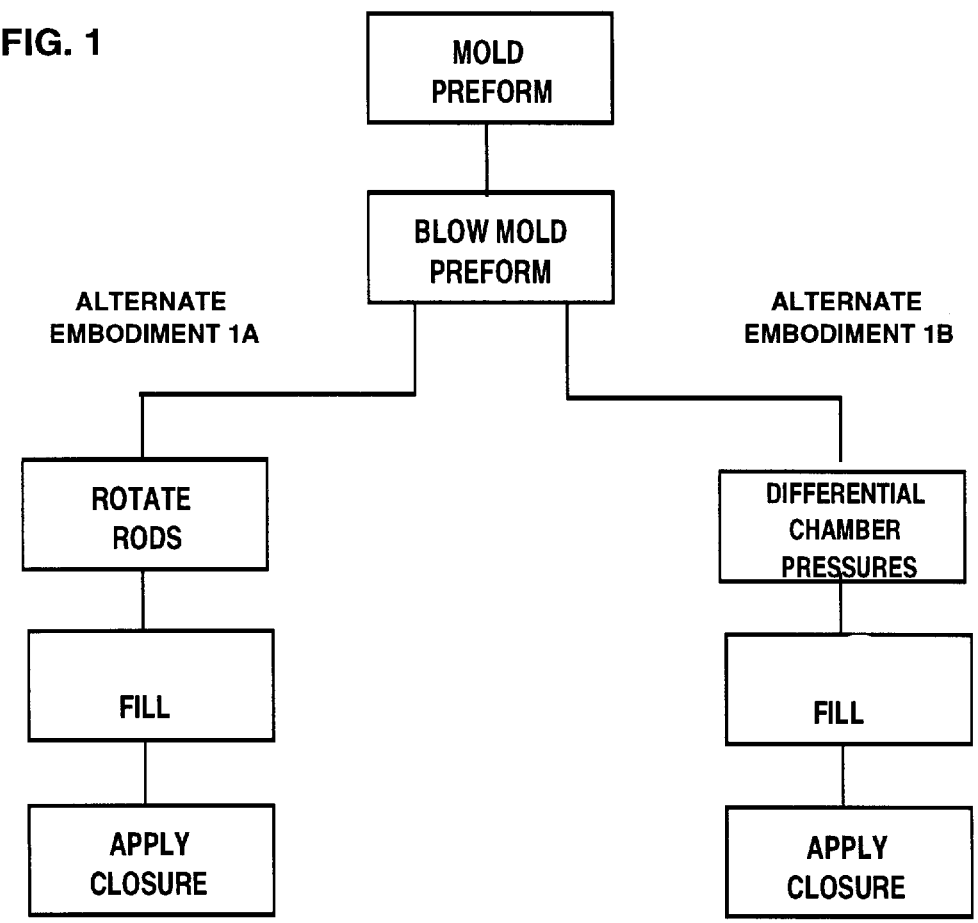
FIG. 1 is a schematic diagram of top fill embodiments of the present invention.

The invention will be described in more detail with reference to the drawings. Although not restricted to tubular containers, it will be described with reference to tubular containers as a preferred embodiment. FIG. 1 sets out schematically the process for making blow molded tubular containers. The first step is to mold the preform. This is usually extruded or injection molded. If not within a mold the preform at about the glass transition temperature then is placed in a mold where the interior surface of the mold has the shape of the tubular container to be made. A gas then is injected to stretch the preform to the mold walls. If the preform is to be injection stretch blow molded one or more stretch rods are inserted into the preform. Usually, there will be at least one stretch rod in each chamber for a multichamber tubular container. When the preform is at a temperature where the plastic is at about the glass transition temperature the stretch rods move downwardly to stretch the plastic longitudinally. At a suitable time a gas, such as dry air, is flowed under pressure into the preform. This gas pressure forces the walls of the preform laterally until they contact the interior surface of the mold. This cool mold surface cools the plastic so that it maintains this form. The mold usually will be maintained at a certain temperature range by means of a heat transfer fluid being flowed through the mold. The molding will occur at about the glass transition temperature of the resin.

As described during blow molding the plastic will be at near the point of flow under the blowing pressure. This usually is about the glass transition temperature. The preform if not in a heated condition will be heated to about the glass transition temperature prior to being put into the mold. The gas pressure during the blow molding will range from about 10 bar to about 40 bar, and preferably about 12 bar to 20 bar. The tubes are produced at a blow ratio of about 10 to 20. The tubular container then is removed from the mold. The web walls are stretched laterally as described herein. The tube then is filled and a closure placed over the open filling and dispensing opening.

The A and B embodiments of the invention in FIG. 1 are directed to multiple chamber tubular containers where the interior web dividing walls are stretched to increase the lateral dimension of the interior divider webs. This is preferable for crimp sealed containers since the chamber separating web or webs at the crimp must be wider than the diameter of the tubular container when the web wall will be located longitudinally in the crimp seal. This also provides for less rigid, more flexible separating web walls which in turn provides for better control over dispensing.. There will be a more uniform dispensing. The separating web walls are stretched mechanically by the lateral movement of rods after the tubular container has been formed or by a differential pressure in the chambers as the tubular container is being formed or after the tubular container has been formed. These processes are set out in FIG. 1 as Embodiment 1A and Embodiment 1B, respectively.

Figure 2:
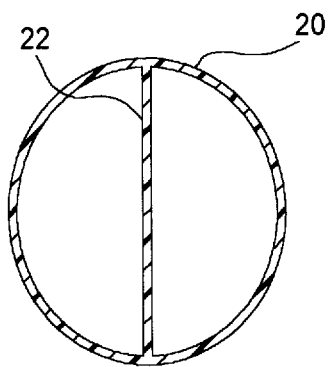
FIG. 2 is a cross-sectional view of one shape for a multichamber container.

In Embodiment A of FIG. 1 and 2, the rods, which can be stretch rods, are rotated by the rotation of the head piece that holds the rods. However, the mold can be rotated and the rods held stationary. This causes the separating web wall to be stretched laterally. This is described in more detail in FIGS. 10 and 11. In Embodiment 1B and 2B of FIG. 1 during, or just after, the blow molding formation of the container, there is caused to be a differential pressure in one or more of the chambers. This will cause a divider web wall where there is a differential pressure to be stretched into the chamber of decreased pressure. A differential pressure of more than about 1 bar, and preferably more than about 3 bar, is advantageously used. However, higher or lower differential pressures can be used. After the web walls have been formed to the desired lateral dimension, the bottom is severed in the instance when it is to be bottom filled to provide a large filling opening, the chamber filled, and the bottom then crimp sealed. When the tubular container is to be top filled, the tubular container is filled and a closure put in place to seal the tubular container.

Figure 3:
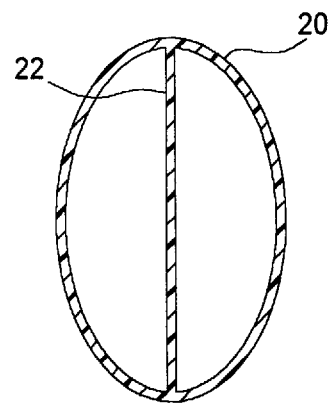
FIG. 3 is a cross-sectional view of another shape for a multichamber container.

FIGS. 2 and 3 show two different cross-sections for the tubular containers 20. These containers have a divider web wall 22. These can be round as in FIG. 2 or elliptical as in FIG. 3. However, the containers can be of many other different shapes. There is no real limitation as to container shape.

Figure 4:
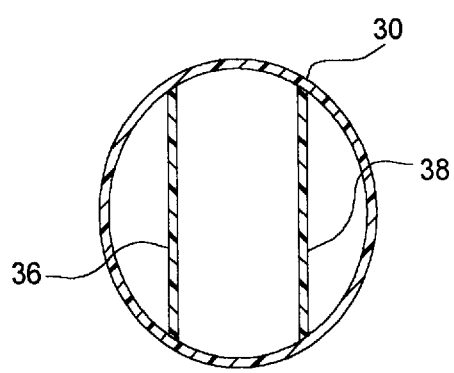
FIG. 4 is a cross-sectional view of a three-chamber multichamber tubular container.
Figure 5:
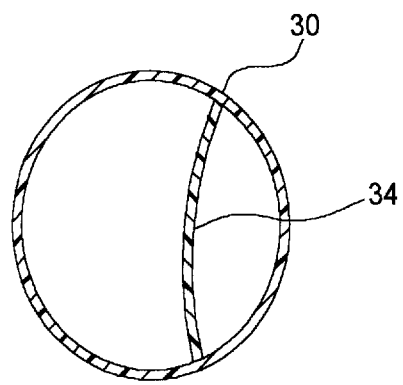
FIG. 5 is a cross-sectional view of a two-chamber multichamber tubular container with the web wall offset in the tubular chamber.

FIG. 4 shows a container with three chambers. The container 30 has interior web walls 36 and 38. In FIG. 5, there is shown the embodiment of container 30 with an offset web wall 34.

Figure 6:
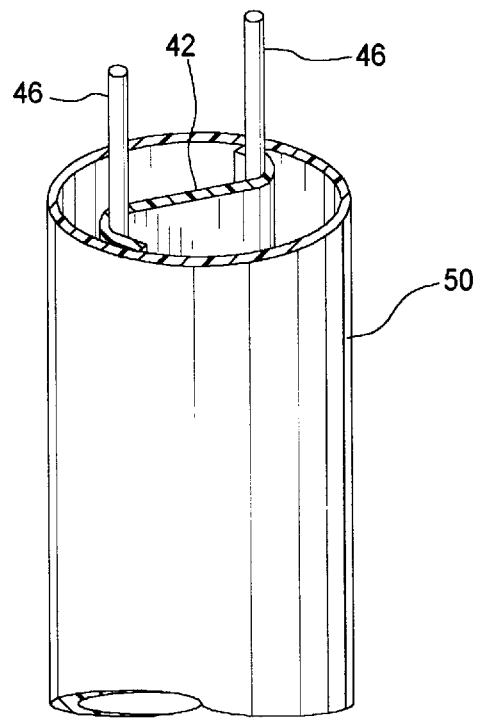
FIG. 6 is an elevational view of a web being stretched laterally by rods.
Figure 7:
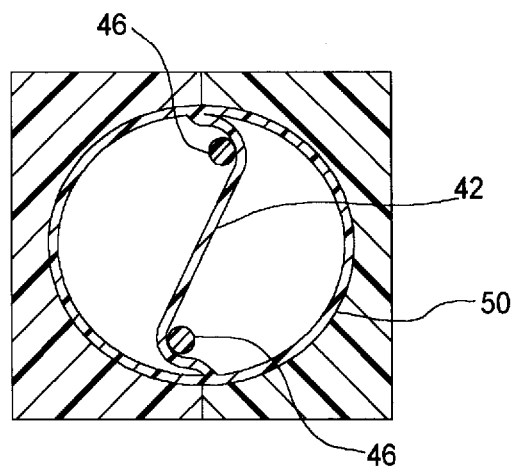
FIG. 7 is a cross-sectional view of the tubular container of FIG. 5.

FIGS. 6 and 7 disclose the stretching of the web wall of a dual chamber container 50. Here the stretching is by the mechanical action of the lateral rotation of rods, such as stretch rods. This would be done while the plastic is at or near the glass transition temperature. This rotation of the rods 46 causes the plastic of divider web wall 42 to be stretched laterally. The effect of this stretching is shown in FIG. 7. This can be conducted as the tube is being blown or after the tube has been blown. It is preferred to rotate the stretch rods immediately after the tube has been blown but while the tube is in mold 48.

Figure 8:
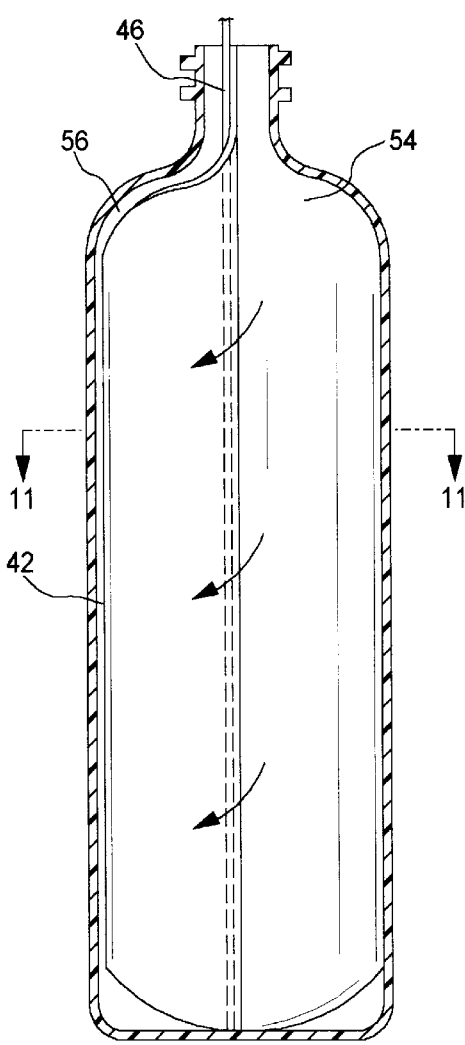
FIG. 8 is an elevational view of a web being stretched laterally by gas pressure.
Figure 9:
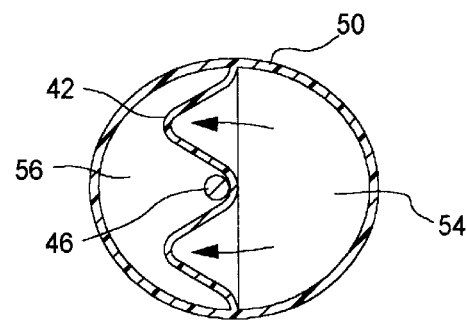
FIG. 9 is a cross-sectional view of the tubular container of FIG. 10.
Figure 10:
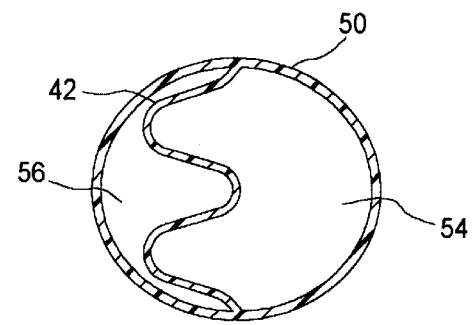
FIG. 10 is a cross-sectional view of a dual chamber tubular container.
Figure 11:
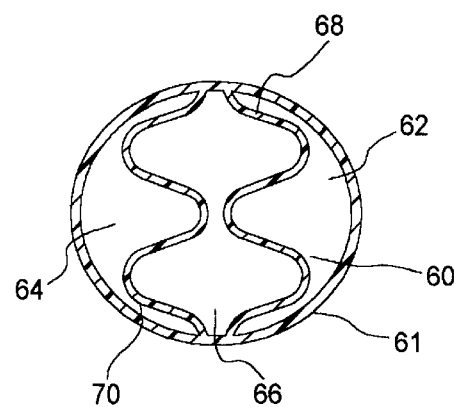
FIG. 11 is a cross-sectional view of the three-chamber.

FIG. 8 describes the lateral stretching of the chamber dividing web wall or web walls by a differential pressure. Here there is a single dividing web wall 42 but the technique is applicable to a plurality of web walls. In this Embodiment 1B and 2B the gas pressure in chamber 54 will be greater than that in chamber 56. This causes web wall 42 to be stretched toward and around the rod 46 that is in chamber 56. Although not necessary, it is preferred in many instances to maintain a rod at least in the chamber of lower pressure to aid in the lateral stretching of the web wall. This rod will support the web wall and will allow for an increased lateral stretching of the web wall. This is shown in more detail in FIG. 9. This differential gas pressure can be achieved by increasing the pressure in chamber 54 or by decreasing the pressure in chamber 56. The result will be essentially the same. In Embodiment 2B the bottom end then is severed and the tubular container inverted for filling. After filling it is crimp sealed closed. This lateral stretching is conducted while the plastic is heated to at or near the glass transition temperature and is moldable. This can be done while the container is being blown or after the container has been blown. It is preferred that this be done immediately after the tube has been blown and while the plastic is still heated. FIG. 10 and 11 show stretched web walls disposed across the containers.

In FIG. 10 the web wall 42 is shown in a flexible, laterally extended condition in tubular container 50. The volume of chambers 54 and 56 can vary depending on the amount of product to be dispensed that is filled into each chamber. In FIG. 11 there is shown a tubular container 60 having three chambers created by two web walls. Web wall 68 separates chambers 62 and 66 and web wall 70 separates chambers 64 and 66. Web walls 68 and 70 have been extended by laterally stretching the web walls after the tubular container was blow molded. As blow molded, the web walls will be disposed across the tubular container as shown in FIG. 4.

The processes for the lateral stretching of the chamber dividing web walls have been described as a part of the process of making the container by blow molding. However, the containers can be produced by other than blow molding and the web walls can be stretched laterally at a later time. It would only be necessary to heat the web walls to about the glass transition temperature of the plastic and laterally stretching the plastic mechanically solely through the use of the rotation of rods or through the use of a differential pressure with or without the use of rods. When the rod or rods are rotated through the rotation of the head piece holding the rod or rods, the web wall is stretched laterally. Likewise, when there is a sufficient differential gas pressure on either side of the web wall, the web wall will be stretched laterally. This can be caused by increasing the pressure on one side of the web wall or by decreasing the pressure on the other side of the web wall.

As noted, the use of a laterally elongated web provides for a very flexible barrier that enhances the uniform delivery of products from the different chambers of the tubular container. The web walls are less rigid and more flexible. It also permits the web to be aligned in the crimp in crimp sealed tubes. In this way a more uniform thickness is being sealed. In this latter regard, the web wall for a dual chamber tube would preferably be about one-half the circumference for round tubular containers. This would be about ½πd where d is the diameter of the tube. However, depending on the number of web walls and their location in the container, they can be of various lengths when stretched laterally.

The blow molded tubular containers of this invention have a high strength and uniform dispensing properties. The tubular containers can be made from any materials that can be stretch blow molded. The preferred materials are polyethylene terephthalate, polyethylene napthanate, modified polyethylene terephthalate, modified polyethylene napthanate, mixtures of these polyesters and polypropylene. The fluid used to blow mold the tubular containers usually will be dry air, however, other fluids such as nitrogen, carbon dioxide or the various inert gases or fluids can be used.

The molds, rods and stretch rods and other equipment used in the processes are standard in the trade. No special or particular equipment is needed. The advantages of the present tubular containers will be achieved by following the described processes.

The techniques that are disclosed are very useful for increasing the lateral dimension of the web walls of multichamber tubular containers. These techniques can be modified in varying degrees, however, all such modifications are within the concepts of the disclosed techniques.

What is claimed is:

1. A method for making containers having a plurality of longitudinally disposed separate chambers comprising:

(a) forming a preform of said container by one of extrusion molding and injection molding, said preform having at least one interior web wall separating the preform into the same number of longitudinally disposed chambers as said container;

(b) placing said preform into a mold and stretching said preform into contact with said mold by at least blowing a gas into said preform to form said container, said container having at least one interior web wall separating said container into said plurality of chambers, said container having a dispensing opening at one end and being closed at another end; and (c) after stretching said preform into contact with said mold in step (b) to form said container to set dimensions then further elongating said at least one interior web wall to a greater lateral dimension by creating a differential gas pressure between at least two of said plurality of chambers.

2. A method as in claim 1 wherein said container is a tubular container.

3. A method as in claim 1 wherein each chamber of said preform is stretched longitudinally as said gas is blown into said preform.

4. A method as in claim 3 wherein said longitudinal stretching is accomplished by means of at least one stretch rod extending into each said chamber of said preform, said at least one stretch rod extending into each said chamber moving longitudinally to stretch said preform.

5. A method as in claim 4 wherein the lateral dimension of said at least one web wall is elongated while in a heated condition.

6. A method as in claim 5 wherein after blowing a gas into said preform to form said preform into said container, forming a differential gas pressure from one chamber to another chamber to increase the lateral dimension of said at least one interior web wall by stretching said at least one interior said web wall.

7. A method as in claim 6 wherein there are at least two chambers, the gas pressure in one of said chambers is increased from the gas pressure in another chamber of said at least two chambers to thereby increase the lateral dimension of said at least one interior web wall.

8. A method as in claim 6 wherein during the period of said differential gas pressure there is at least a rod in a chamber of a lower differential gas pressure.

9. A method as in claim 7 wherein said container is a tubular container.

10. A method as in claim 6 wherein the differential gas pressure of step (c) is created by decreasing the gas pressure in at least one chamber of said plurality of chambers with respect to at least one other of said plurality of chambers to thereby increase the lateral dimension of said at least one interior web wall.

11. A method of making a container having a plurality of longitudinally disposed chambers comprising:

(a) forming a preform of said container, said preform having at least one interior web wall separating a plurality of longitudinally disposed chambers, said at least one interior web wall extending from one end to the other end of said preform;

(b) placing said preform into a mold and stretching said preform by at least blowing a gas into said preform to form a container having the shape of said mold, said container having at least one interior web wall separating said plurality of longitudinally disposed chambers, a dispensing opening at one end and having a closed other end, said at least one interior web wall extending from said one end to said other end of said container; and (c) providing a differential gas pressure in at least one of said plurality of chambers with respect to another of said plurality of chambers to increase the lateral dimension of said at least one interior wall to a dimension greater than that of said at least one interior web wall upon the formation of said container.

12. A method as in claim 11 wherein the differential pressure of said gas in step (c) is caused by decreasing the pressure of said gas in at least one of said plurality of chambers.

13. A method as in claim 11 wherein the differential pressure of said gas in step (c) is caused by increasing the pressure in at least one of said plurality of chambers.

14. A method as in claim 11 wherein there is at least one rod in said plurality of chambers during the period of a differential gas pressure.

15. A method as in claim 12 wherein there is at least one rod in said plurality of chambers during the period of a differential gas pressure.

* * * * *